United States Patent
Robillard et al.

(10) Patent No.: US 11,808,020 B2
(45) Date of Patent: Nov. 7, 2023

(54) LIQUID WASTE RECEPTOR

(71) Applicants: Russell Wayne Robillard, Baton Rouge, LA (US); Fred Wayne Robillard, Baton Rouge, LA (US)

(72) Inventors: Russell Wayne Robillard, Baton Rouge, LA (US); Fred Wayne Robillard, Baton Rouge, LA (US)

( * ) Notice: Subject to any disclaimer, the term of this patent is extended or adjusted under 35 U.S.C. 154(b) by 489 days.

(21) Appl. No.: 16/630,317

(22) PCT Filed: Jul. 20, 2018

(86) PCT No.: PCT/US2018/043014
§ 371 (c)(1),
(2) Date: Jan. 10, 2020

(87) PCT Pub. No.: WO2019/018722
PCT Pub. Date: Jan. 24, 2019

(65) Prior Publication Data
US 2020/0217055 A1 Jul. 9, 2020

Related U.S. Application Data
(60) Provisional application No. 62/535,644, filed on Jul. 21, 2017.

(51) Int. Cl.
*E03C 1/26* (2006.01)
*E03F 5/04* (2006.01)
(Continued)

(52) U.S. Cl.
CPC .............. *E03C 1/26* (2013.01); *B01D 29/56* (2013.01); *B01D 35/02* (2013.01); *B32B 27/08* (2013.01);
(Continued)

(58) Field of Classification Search
CPC ......... E03F 5/0404; E03F 5/0407; E03F 5/06; E03F 2005/0413; E03F 5/0403;
(Continued)

(56) References Cited

U.S. PATENT DOCUMENTS 412,195 A * 10/1889 Marker ................... E03C 1/264
4/289
774,201 A * 11/1904 Robischon .............. E03C 1/264
4/289
(Continued)

FOREIGN PATENT DOCUMENTS

CN          107461015 A  * 12/2017  ............. E04F 15/22

OTHER PUBLICATIONS

English Translation of Zhao et al Patent Publication CN 107461015A, published Dec. 12, 2017. (Year: 2017).*

*Primary Examiner* — Joseph W Drodge
(74) *Attorney, Agent, or Firm* — ROY KIESEL FORD DOODY & NORTH, APLC

(57) ABSTRACT

A strainer assembly for use with a floor waste receptor having vertical walls and a floor forming a well into which liquid waste material can be collected and directed toward a well discharge opening and then into a drain pipe, the vertical walls having an outer flange extending outward from the vertical walls at a position below the top surface formed by the vertical walls, and an inner ledge formed below the top surface, and the floor shaped to form a ledge around the drain opening, comprising: a well discharge opening strainer assembly; a basket strainer sized to fit in the well and over the well discharge opening strainer assembly and sit on the floor ledge, the basket strainer provided with openings sized to permit liquid water matter of a second predetermined size to move from the floor receptor well through the basket strainer and into the well discharge
(Continued)

opening strainer assembly, and a grate strainer sized to sit on the interior ledge.

11 Claims, 18 Drawing Sheets

(51) Int. Cl.
    *E03F 5/06*           (2006.01)
    *B32B 27/08*         (2006.01)
    *B01D 29/56*         (2006.01)
    *B01D 35/02*         (2006.01)

(52) U.S. Cl.
    CPC .............. *E03F 5/0407* (2013.01); *E03F 5/06* (2013.01); *B01D 2201/48* (2013.01); *E03F 2005/0413* (2013.01)

(58) Field of Classification Search
    CPC . E03F 5/041; E03C 1/26; E03C 1/264; B32B 27/08; E04F 17/00; E04F 17/10; B01D 29/03; B01D 29/035; B01D 29/56; B01D 29/58; B01D 2029/035; B01D 35/02; B01D 2201/31; B01D 2201/48; C02F 1/001; C02F 2103/32
    USPC ..... 210/163, 164; 4/679, 286, 289, 290, 292
    See application file for complete search history.

(56) References Cited

U.S. PATENT DOCUMENTS

| | | | | |
|---|---|---|---|---|
| 935,000 | A * | 9/1909 | Dehn | E03F 5/0404 285/396 |
| 989,410 | A * | 4/1911 | Peters | E03C 1/264 4/289 |
| 1,756,290 | A * | 4/1930 | Hibner | E03C 1/264 4/289 |
| 2,885,689 | A * | 5/1959 | Morris | E03C 1/06 210/163 |
| 4,321,713 | A * | 3/1982 | Thompson | E03C 1/26 4/290 |
| 4,557,091 | A * | 12/1985 | Auer | F16B 5/0052 52/592.4 |
| 5,051,175 | A * | 9/1991 | Walczak | E04D 13/0409 210/166 |
| 5,069,781 | A * | 12/1991 | Wilkes | E03F 5/041 4/290 |
| 5,486,287 | A * | 1/1996 | Murphy | E03F 5/0407 210/164 |
| 5,862,535 | A * | 1/1999 | Noga | E03C 1/264 4/286 |
| 6,537,448 | B2 * | 3/2003 | Houk | E03C 1/18 210/164 |
| 7,300,573 | B1 * | 11/2007 | Trangsrud | E03F 5/0404 210/163 |
| 7,504,024 | B1 * | 3/2009 | Batten | E03C 1/264 4/290 |
| 7,875,178 | B2 * | 1/2011 | Ashliman | E03F 5/0404 210/163 |
| 8,347,906 | B1 * | 1/2013 | Ismert | E04G 15/061 4/293 |
| 8,628,657 | B1 * | 1/2014 | Robillard | E03F 5/0407 210/163 |
| 10,513,841 | B1 * | 12/2019 | Robillard | E03C 1/244 |
| 11,268,267 | B1 * | 3/2022 | Robillard | E03C 1/244 |
| 2002/0070151 | A1 * | 6/2002 | Houk | E03C 1/18 210/163 |
| 2004/0079040 | A1 * | 4/2004 | MacLean | A01K 1/0151 52/302.1 |
| 2005/0281999 | A1 * | 12/2005 | Hofmann | B32B 5/18 428/319.3 |
| 2010/0310897 | A1 * | 12/2010 | Takaki | B62D 29/007 428/586 |

\* cited by examiner

LIQUID WASTE RECEPTOR

BACKGROUND OF THE INVENTION

Field of the Invention

This invention relates in general to liquid waste receptors, and more particularly to liquid waste receptors, such as, floor drains, floor sinks, floor troughs, floor trench channels, and other similar liquid waste receptors having strainers or filters to control what liquid waste will be permitted to enter the floor drain of a building drainage system.

Prior Art

During the use of a commercial kitchen it is common during food preparation, cooking and/or clean-up operations that various liquids, food particles, and cooking or eating utensils will end up on the kitchen floor. It is common that at various times of the day these items will be sweep or washed toward a floor drain forming part of the building drainage system. Typically, there will be floor sink or a floor trough positioned to receive these various items before they enter the floor drain. A floor trough is basically a larger floor sink. A floor trench is a type of floor trough. It is also common for the floor to include a strainer device that filters what items will be permitted to enter the drain and which of the items will remain in the well of the floor sink to be manually collected and disposed or recovered separately. One example of such a strainer device is a grate extending over the top surface of the floor sink. The grate is constructed to prevent a person from accidently stepping into the well of the floor sink as well as to block larger items from passing into the floor sink. Despite the advancements in the prior art there remains the problem various floor sink and trough strainer devices can become clogged and/or permit unwanted debris to enter the building drainage/sewer system.

Objects of the Invention

Therefore, it is an object of this invention to provide an improved strainer assembly that better prevents clogging of a liquid drainage receptor, such as a floor sink or floor trough.

It is another object of this invention is to provide a strainer assembly providing a desired flow rate of the liquid that is allowed to enter the liquid drainage receptor, such as a floor sink or floor trough, to prevent back up in the well of the liquid drainage receptor.

Still another object of this invention is to provide a strainer assembly that is constructed to more easily create a smooth flat even transition from the floor covering and the liquid drainage receptor outer rim.

Still another object of this invention is to provide strainer assembly that results in the liquid drainage receptor catching any liquid with or without solid particles from the area surrounding the liquid drainage receptor or for receiving indirect waste from any plumbing fixtures or equipment which requires a liquid drainage receptor be used.

A still further object of this invention is to provide a strainer assembly constructed from materials allowing usage with temperatures of 212° Fahrenheit or higher is needed.

A further object of this invention is a liquid waste receptor and its strainer assembly be constructed from material that provides both impact resistance and rigidity characteristics needed.

Still further it is an object of this invention to provide a liquid waste receptor that permits better waterproofing between the floor surface and any substrate beneath the floor surface while at the same time permitting the receptor upper surface to be level with the floor surface is needed.

A further object of this invention is to provide a liquid waste receptor and it strainer assembly be constructed to accommodate variances in the inside diameter of the drain pipe that permits easier and quicker attachment of the strainer assembly to the drain pipe.

It is another objective of this invention to provide a liquid waste receptor constructed to permit easy and quick removal of any strainer assembly from the liquid waste receptor without compromising the filtering integrity of the liquid waste receptor.

It is an objective of this invention that the strainer assembly retain any liquid or solid waste particles to permit their easy removal from the strainer assembly.

Another objective of this invention is to provide a strainer assembly to better ensure the capture of smaller particles such as sand, coffee grinds, oyster shells, rice, and similar particles, as well as prevent stringy food and other items from entering the drain pipe which might clog either the openings of the strainer assembly or the drainage systems traps.

Another objective is to provide a strainer device that is located in various non-foot traffic area, such as under stoves or cabinets that can also serve as the primary filter for a drain normally used to receive indirect waste.

Other advantages and objectives of the invention are inherent or obvious to a person of ordinary skill in the art from the ensuing descriptions of the invention.

SUMMARY OF THE INVENTION

These objectives of the invention are achieved by the use of a liquid waste receptor, such as illustrated and described herein, that utilizes a grate strainer constructed to hold the weight of a person standing on the grate strainer when it is seated on and extending across the top open surface of the liquid waste receptor. The grate is provided with a series of openings of predetermined size to capture larger items contained in the liquid waste while allowing the liquid waste and smaller items to pass through the grate opening and directly or indirectly into the well of the liquid waste receptor. In addition the liquid waste receptor incorporates a strainer assembly comprising a well drainage opening strainer assembly, a basket strainer, and a basket filter combination. The well drainage opening strainer assembly comprises a rigid support structure which when screwed into a flexible sealing member will affix the well drainage opening strainer assembly to the discharge tube of the liquid waste receptor extending down from the liquid waste well and into the drainage pipe of the building drainage/sewerage system. It is preferred that the rigid support structure have a vertical axially centered passageway that aligns with a similarly sized passageway in the dome-shape strainer permitting a screw entering the rigid support structure passageway to extend into the dome-shape strainer to operatively affixed the two elements to one another. In this embodiment the screw cannot be readily accessed when the basket strainer is removed. This prevents a person from accidently removing the dome-shape strainer assembly from the discharge pipe which would allow undesired material to flow into the drain pipes of the building drainage/sewerage system. To utilize this feature, one first affixes the rigid support member to the dome-shape strainer by the screw, and then one screws the rigid support member into the flexible sealing member.

The basket strainer is sized and shape to rest over the well discharge opening strainer assembly and on a support ledge on the liquid waste receptor. The basket strainer has openings of a second predetermined size and shape to trap items that have passed through the grate strainer, but which one does not want to pass into the drainage pipe and which one wants to easily and quickly remove from the liquid waste receptor. The basket strainer is provided with a handle to facilitate the quick removal of the basket strainer from the liquid waste receptor. In a preferred embodiment the basket strainer is also provided with flaps extending at an upward angle to the basket strainer perimeter flange to provide additional means for a person to grip the basket strainer in order to remove it from the liquid waste receptor.

In a preferred embodiment the liquid waste receptor can also include a basket filter shaped to fit into the basket strainer. Preferably the basket filter has an opening through which the handle of the basket strainer can extend to allow the quick and easy removal of both the basket filter and the basket strainer simultaneously. The basket filter has walls of a small mesh-type material that prevents fine particles, such as coffee grinds, grit, sand, oyster shell pieces, rice particles and certain stringy food particles, string pieces and like material that can collect and clog up the drain system traps, from passing through the basket strainer.

The foregoing has outlined rather broadly the features and technical advantages of the present invention in order that the detailed description of the invention that follows may be understood. Additional features and advantages of the invention will be described hereinafter which form the subject of the claims of the invention. It should be appreciated by those skilled in the art that the conception and specific embodiments disclosed may be readily utilized as a basis for modifying or designing other formulations and methods for carrying out the same purposes of the present invention. It should also be realized by those skilled in the art that such equivalent formulations and methods do not depart from the spirit and scope of the invention as set forth in the appended claims. The novel features which are believed to be characteristic of the invention, both as to its organization and method of operation, together with further objects and advantages will be better understood from the following drawings and descriptions of the preferred embodiments of the invention.

PREFERRED EMBODIMENTS OF THE INVENTION

Figure 1:
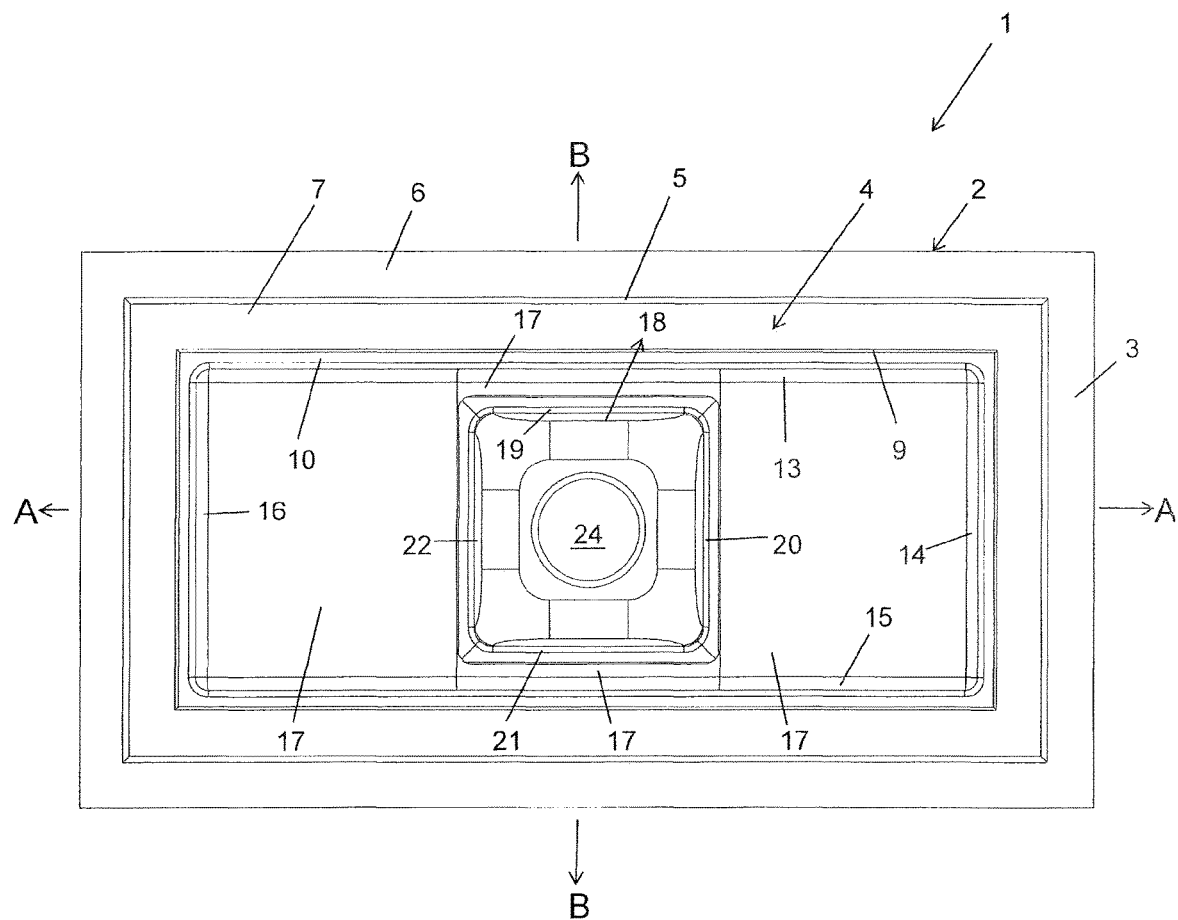
FIG. 1 is a top view of a floor trough use to collect waste water and other debris that has fallen to the floor of a kitchen.
Figure 1A:
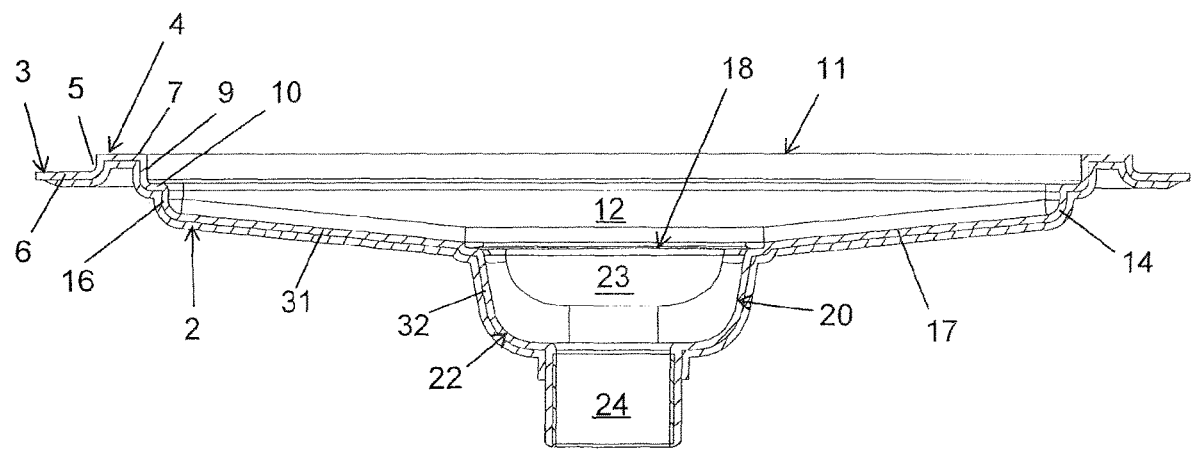
FIG. 1A is a cross-sectional view taken along lines A-A of FIG. 1.
Figure 1B:
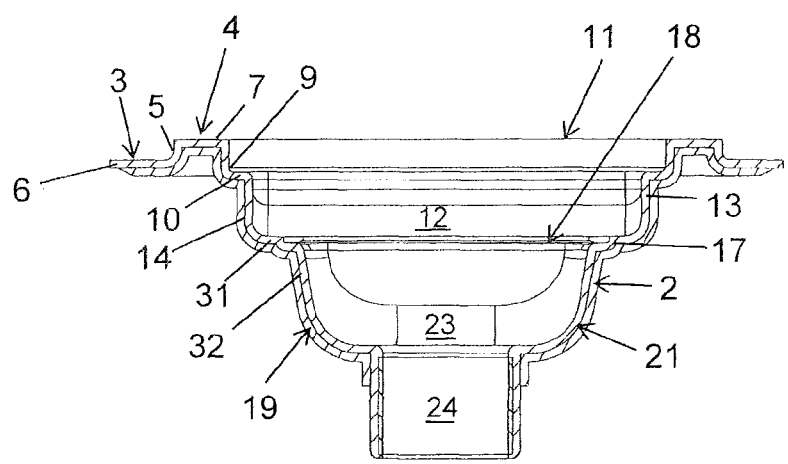
FIG. 1B is a cross-sectional view taken along lines B-B of FIG. 1.
Figure 2:
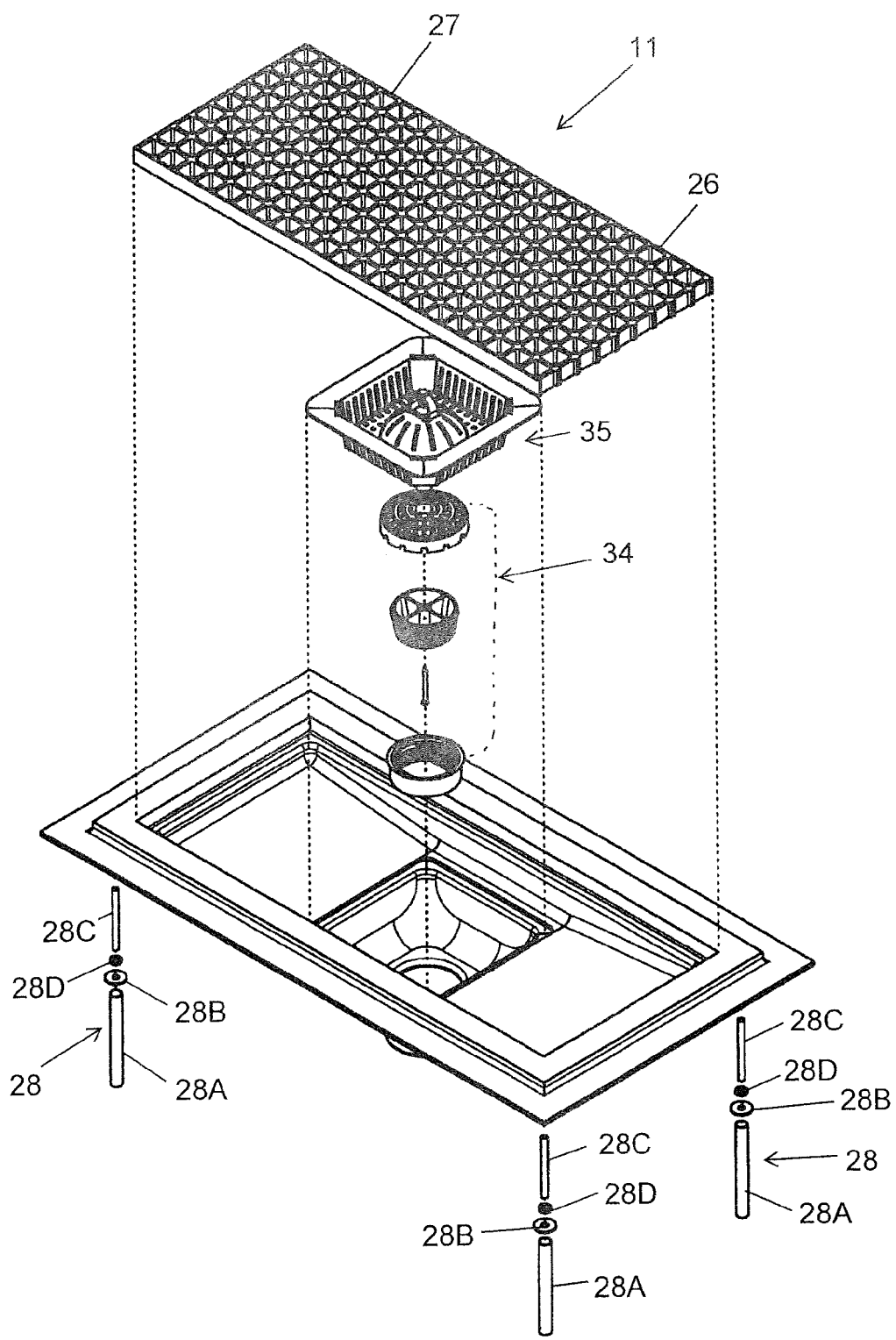
FIG. 2 is a three-quarter exploded view of one preferred embodiment of a novel strainer assembly, including a basket strainer and a well discharge opening strainer assembly, positioned under the trough grate and in the well of the floor trough illustrated in FIG. 1.

Turning now to FIGS. 1-2, a liquid waste receptor 1, such as the floor trough illustrated, is constructed having a frame 2 whose perimeter forms an outer flange 3 having a rectangular shoulder member 4 extending above outer flange 3. On the exterior side wall 5 of shoulder member 2, outer flange 3 forms an extending flat surface 6 below the top surface 7 of shoulder member 2. The flat surface 6 permits installation of a flooring 8 (see FIGS. 15-17) that may consist of a layer of waterproofing material, and/or a thinset material and/or a tile or other surface material that is level with the top surface 7 of shoulder member 4. Thus, better waterproofing between the flooring 8 and any substrate, such as concrete, beneath the flooring 8 is obtained while at the same time permitting the shoulder member top surface 7 to be level with flooring 8 to minimize the chance that a person would trip over the waste receptor 1.

On shoulder member interior side wall 9, shoulder member 4 extends below outer flange 3 and to form a ledge or seat 10 on which grate 11 can be placed to cover well 12 of floor trough 1. The well 12 is formed by walls 13-16 that slope downward to floor 17. Floor 17 is provided with a collection opening 18 having walls 19-22 extending downward to form sink 23. Sink 23 is provided with a discharge passageway 24. Passageway 24 is operatively positioned to cause any water or other matter passing through passageway 24 to flow into the discharge pipe 25 of the building drainage/sewerage system (not shown).

Figure 3:
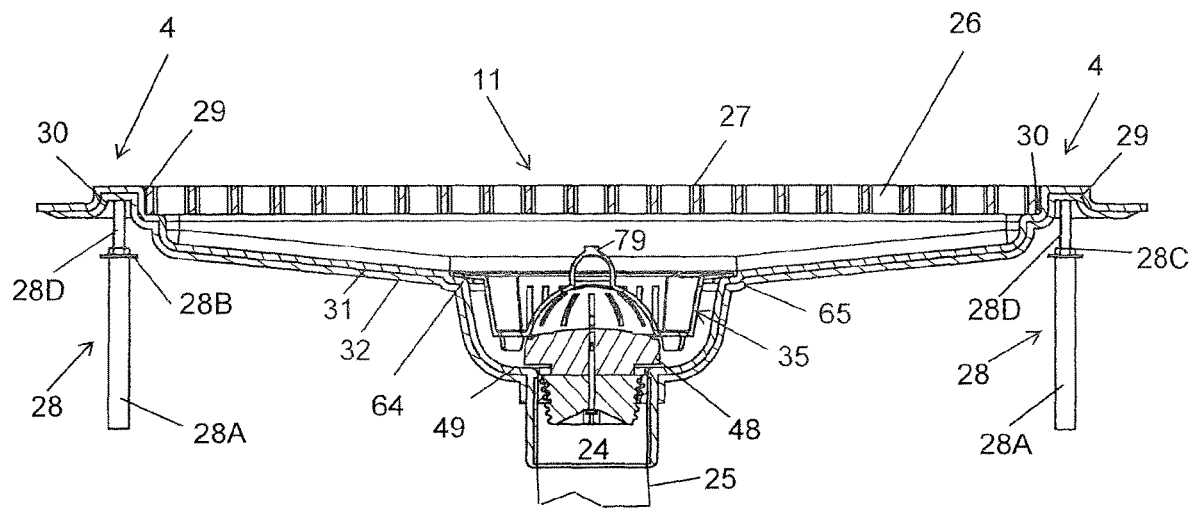
FIG. 3 is a cross-sectional view of strainer assembly as illustrated in FIG. 2 positioned in the well of a trough drain having a novel perimeter construction.

As better seen in FIGS. 2-3, grate 11 is provided with a series of openings 26 to permit liquid and other matter to pass into well 12, while at the same time preventing larger items such as large or wide utensils from passing into well 12. When grate 11 is rested on ledge or seat 10, the top surface 27 of grate 11 is level with the shoulder top surface 7. To affix floor trough 1 in the desired position in the concrete kitchen floor, four leg anchors 28 are embedded into the concrete floor at a location permitting the four leg anchors 28 to support the floor trough 1 by allowing the shoulder member sections 29 formed by the interior surfaces 30 of the shoulder members 4 to rest on the four leg anchors 28. Each leg anchor 28 consists of a hollow, interiorly threaded post 28A having a washer 28B affixed to the top extending end of post 28A, an exteriorly threaded shaft 28C screwed into post 28A and fixed into position by nut 28D. This arrangement allows height adjustments to be made to the floor trough 1 to aid in positioning its level with the floor tile (not shown) that will be grouted or otherwise fixed over outer flange flat surface 6.

FIG. 3 illustrates a preferred embodiment of floor trough 1 wherein is constructed having a bonded dual material frame 2 forming the floor trough 1 and well 12. The frame 2 includes a top layer 31 constructed from a material having a softer, resilient impact resistant material, such as rubber, plastic and other similar materials. This top layer 31 helps prevent breakage of objects falling on frame 2, such as crockery or glass cooking pots and pans. Because it is not uncommon that food service employees will put boiling water directly into the floor trough 1, it is also preferred that top layer 31 be constructed from a material that can withstand temperatures of at least 212° F. without distortion or damage to the structural stability of top layer 31, as well will not result in failure of its bond to bottom layer 32 of frame 2. It is preferred that bottom layer 32 being constructed of a material providing structural strength, such as stainless steel, fiberglass, and other similar materials. This bottom layer 32 provides durability and helps the frame to maintain its shape when receiving physical forces, such as when a person stands on the grate 11, or the bottom layer 32 is struck by falling iron pots and pans and similar cooking apparatus.

FIGS. 2-5 also illustrate one preferred embodiment of the novel strainer assembly 33 of this invention. In the preferred embodiment illustrated strainer assembly 33 comprises a sink discharge opening strainer assembly 34 (see FIG. 4) that is attached to the building sewerage/drainage system discharge pipe 25 that extends into well discharge passageway 24, and a basket strainer 35 that is constructed to fit over sink discharge opening strainer assembly 34 and rest on top of the walls 13-16 forming well 12. More preferably, well discharge opening strainer assembly 34 comprises a resilient or flexible member 36 sized and shaped to fit snuggly inside sink passageway 24. Member 36 should be sufficiently flexible to accommodate variances in the inside diameter of passageway 24. Member 36 is provided with internal threads 38. Well opening strainer assembly 34 also comprises rigid support member 38 provided with external threads 39 that can be operatively screwed onto internal threads 37 of member 36. In a preferred embodiment threads 37 of member 36 are wider at the bottom section 40 of member 36 than at the top section 41 of member 36. On the other hand, exterior threads 39 of rigid support member 38 are wider at the top section 42 of rigid support member 38 than at the bottom section 43 of rigid support member 38. As a result when rigid support member 38 is threaded into member 36, the bottom section 40 of member 36 is expanded outward to better seal member 36 against passageway 24. When rigid support member 38 is removed from member 36, member 36 should be sufficiently resilient to return to its original shape to permit its easy removal from passageway 24. In an alternate preferred embodiment member 36 is provided with exterior flexible ribs that can bend to accommodate variances in the inside diameter of passageway 24 by providing the necessary friction between the member 36 and the interior wall of passageway 24. In this embodiment the interior wall of member 36 could be smooth without threads, and ridge support member 38 could be provided with a male tapered thread that would self-tap into the member 36. Well opening strainer assembly 34 also comprises a dome-shaped strainer 44 that sits on rigid support member 38 and is affixed to rigid support member 38 by connecting screw 45 that operatively extends through threaded central vertical aligned threaded passageways 46 and 47 of rigid support member 38 and dome-shaped strainer 44, respectively. As seen in FIG. 3, dome-shaped strainer 44 is preferably sized whereby its outer perimeter 48 also sits on well floor 49 and is held firmly against well floor 49 by connecting screw 45 as it is threaded into dome-shaped strainer 44.

Figure 4:
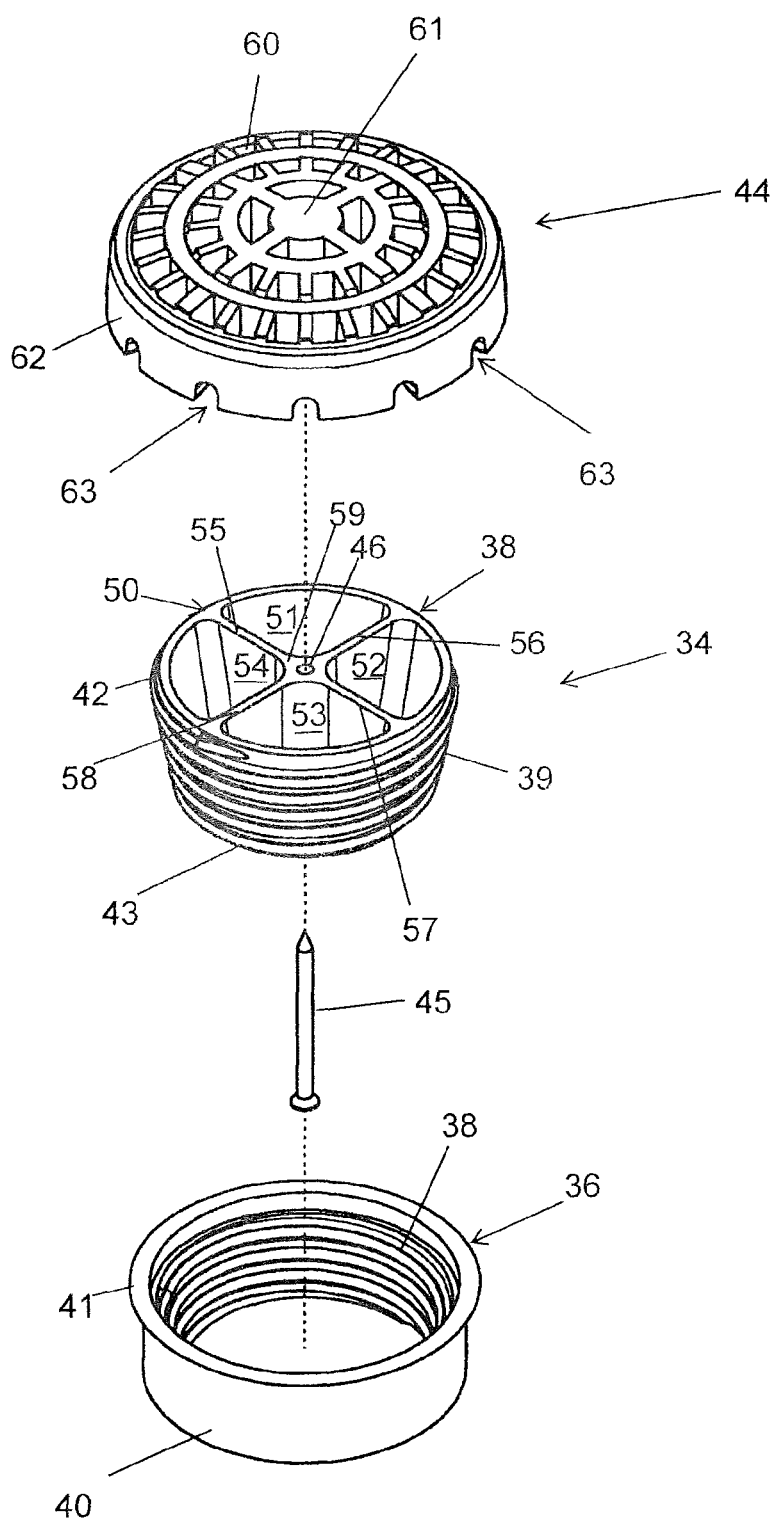
FIG. 4 is a three-quarter exploded view of one preferred embodiment of the well drainage opening strainer assembly, comprising a resilient member having internal threads, a rigid support member having external threads and a dome shaped strainer positioned over the rigid support member and affixed thereto by a securing means, such as a screw.
Figure 5:
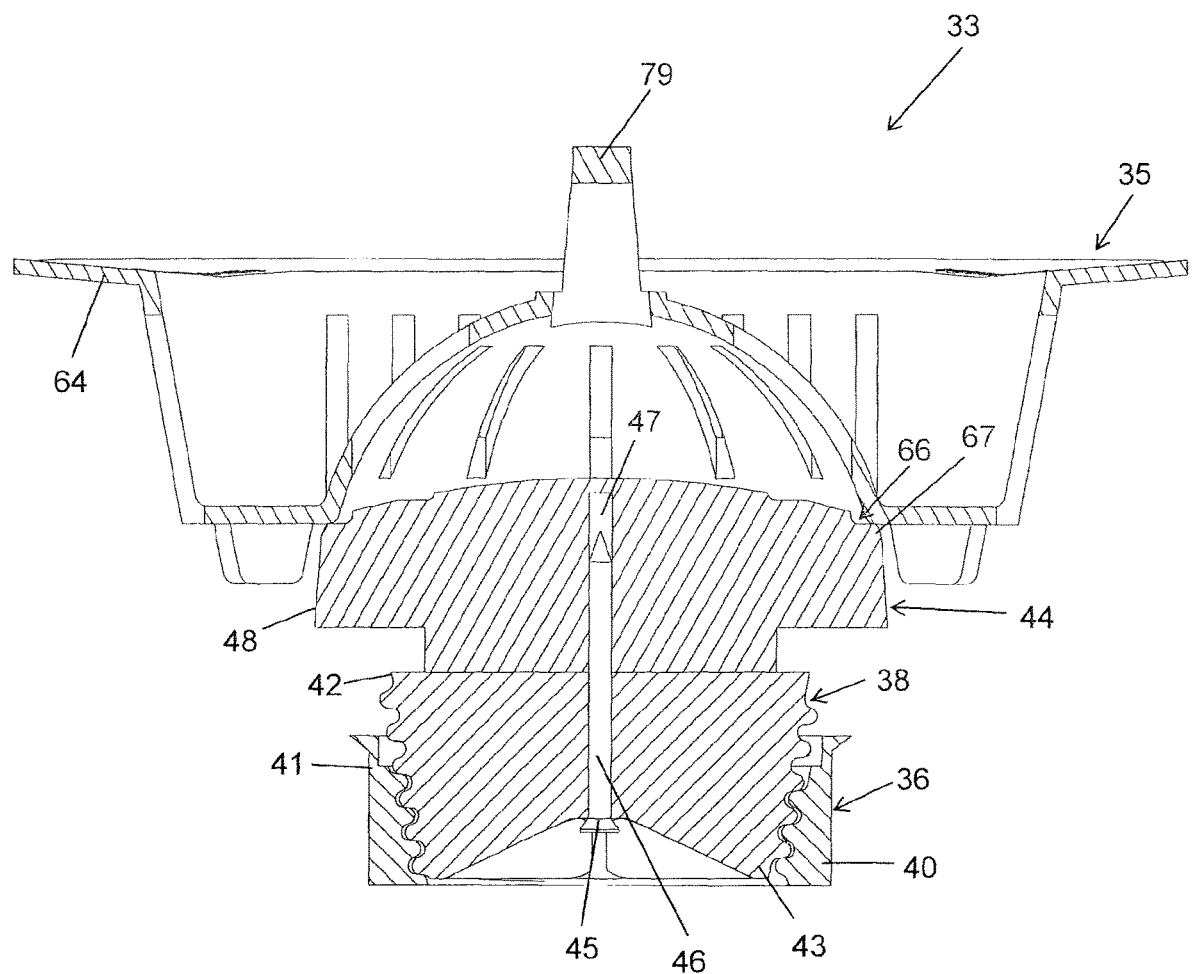
FIG. 5 is a cross-sectional view of the novel strainer assembly illustrating the position of the flexible expandable member, the rigid support member, the well drainage opening strainer and the basket strainer.

As seen in FIG. 4, in a preferred embodiment of rigid support member 38 having a body 50 constructed having four passageways 51-54 formed by walls 55-58 radiating outward from body center section 59 through which screw passageway 46 extends. In this embodiment dome-shaped strainer 44 is provided with multiple passageways 60 positioned about body center section 61 into which screw opening 47 extends. The size and shape of passageways 60 can be varied to control the water and other material flowing through dome-shaped strainer 44. In a preferred embodiment the bottom perimeter area 62 of dome-shaped strainer 44 is provided with a series of separated back pressure relief openings 63 to allow excess water to flow back into well 12 in the event there is back pressure in the drainage system.

As seen in FIGS. 2-5 and FIGS. 9-12, basket strainer 35 is sized whereby its perimeter flange 64 rests on a groove or seat area 65 of sink walls 19-22. Seat area 65 provides a guide as to where to position (both depth wise as well as area wise) strainer basket 35, as well as, provide better assurance strainer basket 35 will not move out of the desired position. Alternatively, dome-shaped strainer 44 can be constructed having a seat area 66 located on its upper perimeter area 67. This too helps provide a stable place for strainer basket 35 to remain stable and also holds the strainer basket 35 above the sink discharge passageway 24 to ensure adequate water flow through strainer basket 35. These constructions also permits easy and quick removal of strainer basket 35 without compromising the integrity of the intended filtering purpose of sink discharge opening strainer assembly 34. The four basket strainer slotted vertical walls 68-71 and corner walls 72-75 are constructed to extend into well 12. The vertical wall slots 76 in vertical walls 68-71 preferably extend from floor 77 of basket strainer 35 to the perimeter flange 64. The width of vertical wall slots 76 is utilized to control the size and type of waste or debris that would be allowed to pass through basket strainer 35 to dome-shaped strainer 44. The basket strainer floor 77 is provided with a raised dome-shaped center section 78 sized to fit over dome-shaped strainer 44. A handle 79 is affixed to the top of dome-shaped center section 78 to assist a person in lifting and removing the basket strainer 35 without having to put their hands into the debris in basket strainer 35 which could include sharp objects such as broken glass or to access the sink opening strainer assembly 34 for removing any debris captured by the dome-shaped strainer 44. The basket strainer floor 77 is constructed having a series of openings 80 to permit water in basket strainer 44 to be collected in well 12. In addition dome-shaped center section 78 is constructed having a series of vertical arc-shaped openings 81 to permit water in basket strainer 35 to flow to and then through waste water passageways 60 in dome shaped strainer 44.

Figure 6:
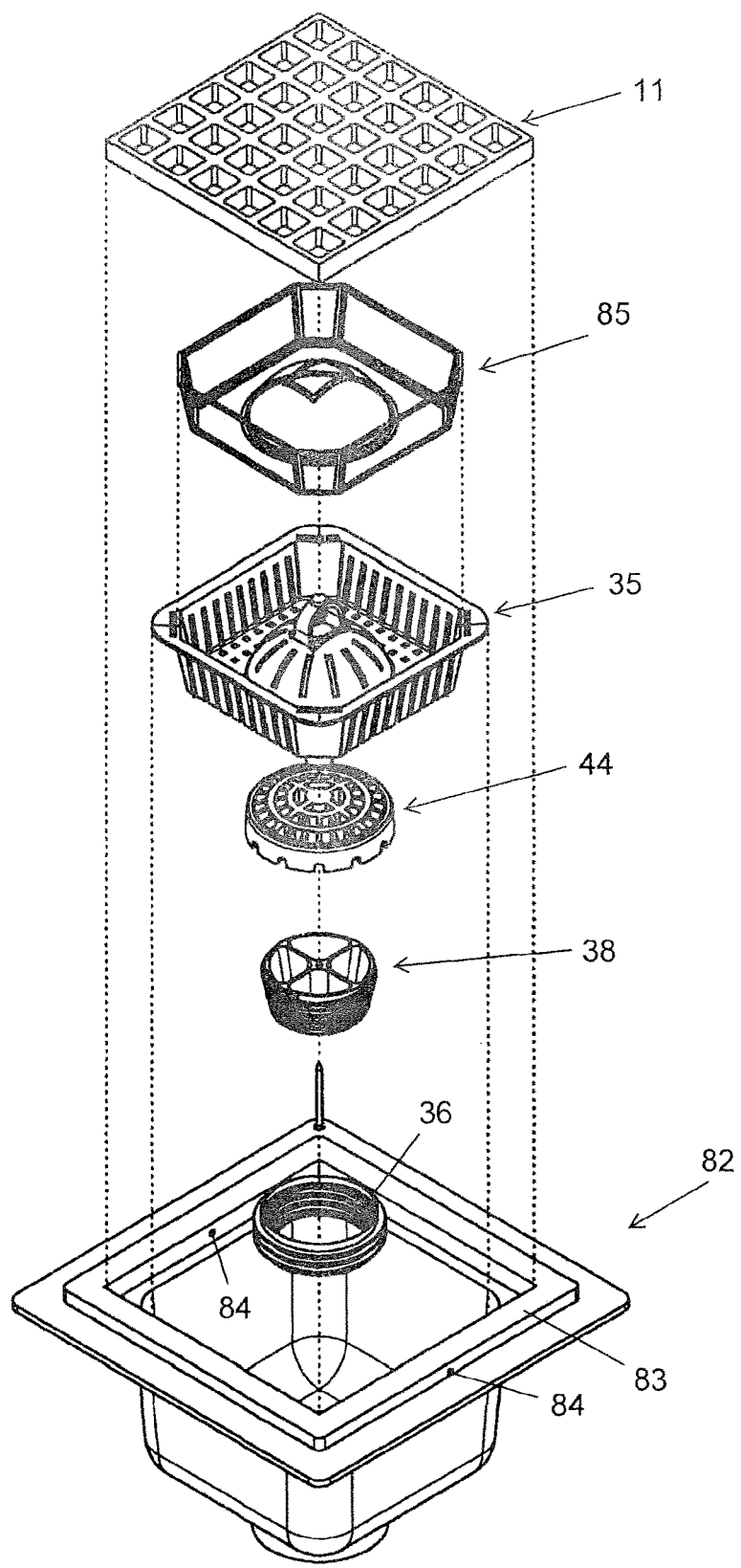
FIG. 6 is a three-quarter exploded view of the use of the strainer assembly with a floor sink with the strainer assembly further comprising a basket filter fitted into the basket strainer of one preferred embodiment of the basket strainer.

FIG. 6 illustrates the use of another preferred embodiment of the strainer assembly 33 in a floor sink 82. In another preferred embodiment shoulder member 83 of floor sink 82 is constructed to have a series of weep holes 84 to permit waste liquid that has seeped below the finished floor tile to be directed into weep holes 84 and then into floor sink 82. This is important for waterproofing applications on multistory applications or any situation where the floor is not a concrete slab on grade construction where it is desired to prevent any liquid waste from permeating into the soil.

Figure 7:
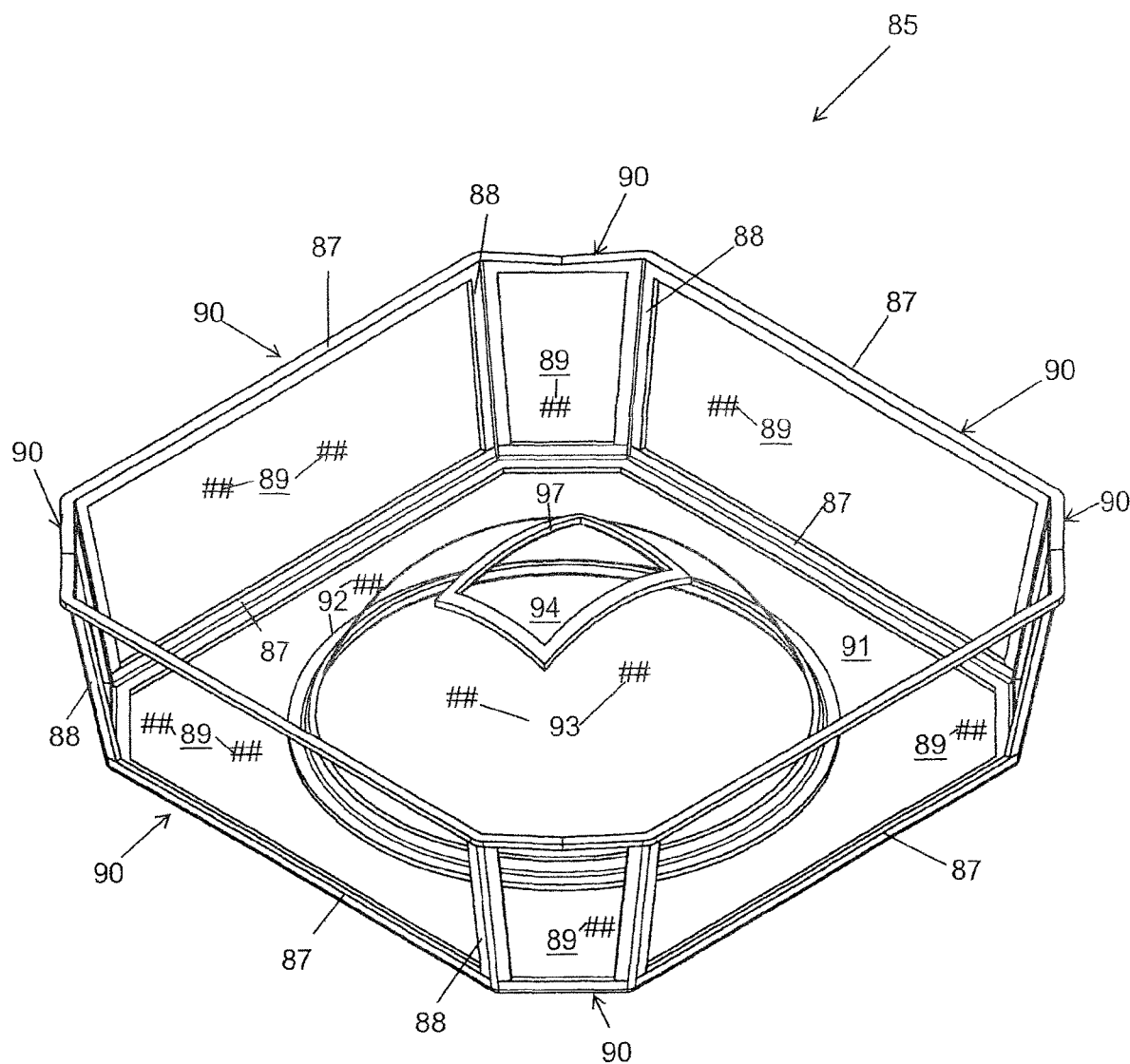
FIG. 7 is a three-quarter view of the basket filter.
Figure 8:
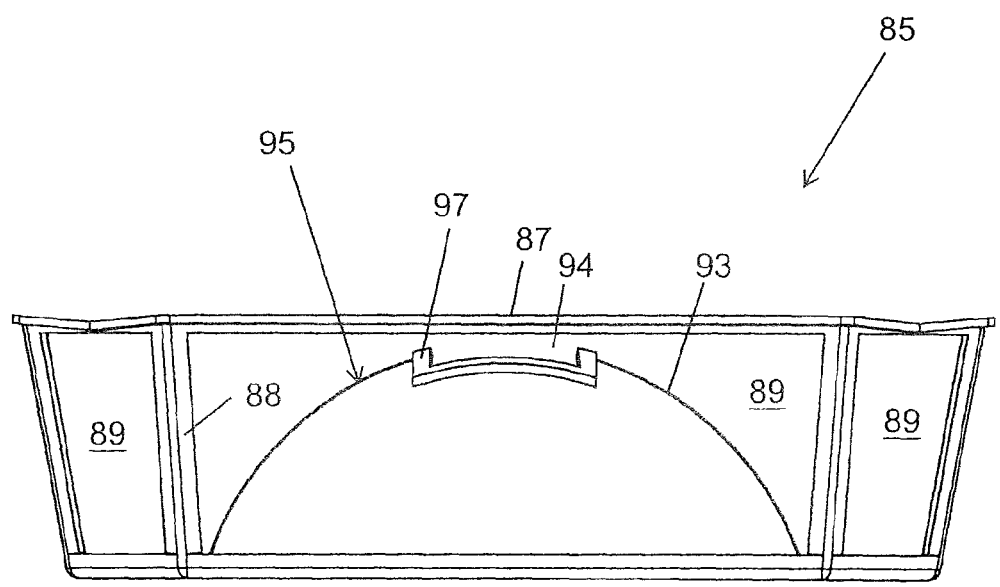
FIG. 8 is a side view of the basket strainer illustrated in FIG. 7.
Figure 9:
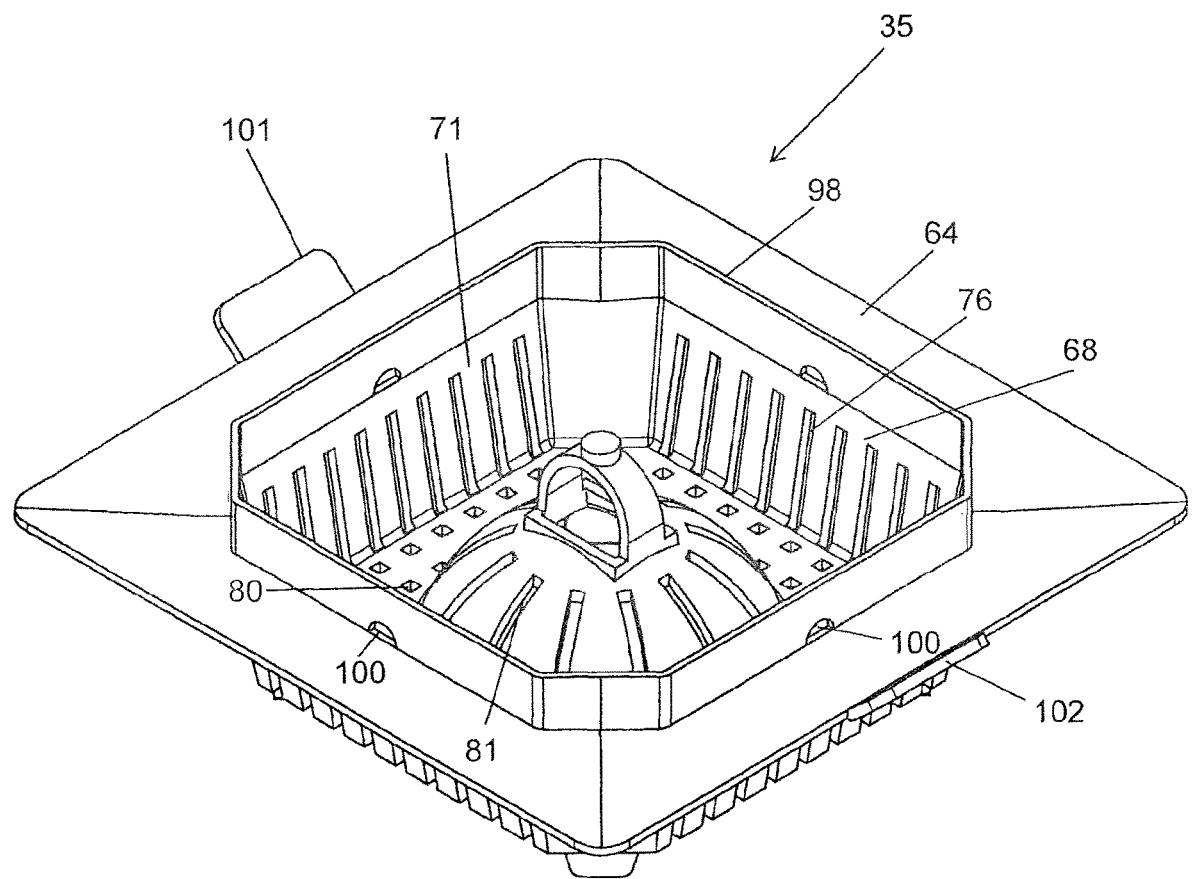
FIG. 9 is a three-quarter view of another preferred embodiment of a basket strainer having a raised lip wall with a series of drain opening extending up from the perimeter flange of the basket strainer and with handles extending outward from the perimeter flange.
Figure 10:
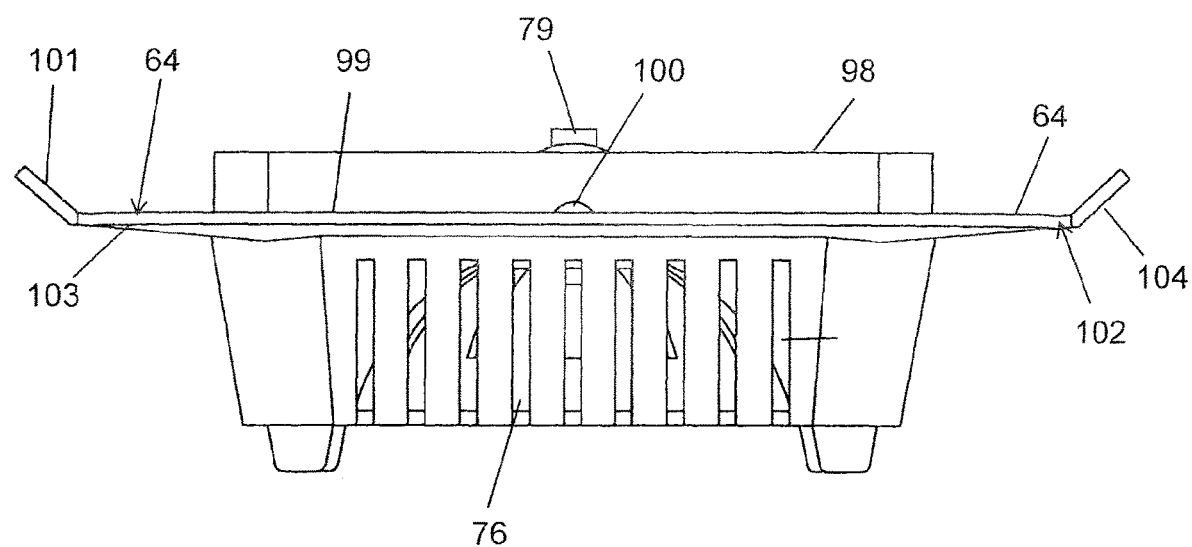
FIG. 10 is a side view of the basket strainer of FIG. 9
Figure 11:
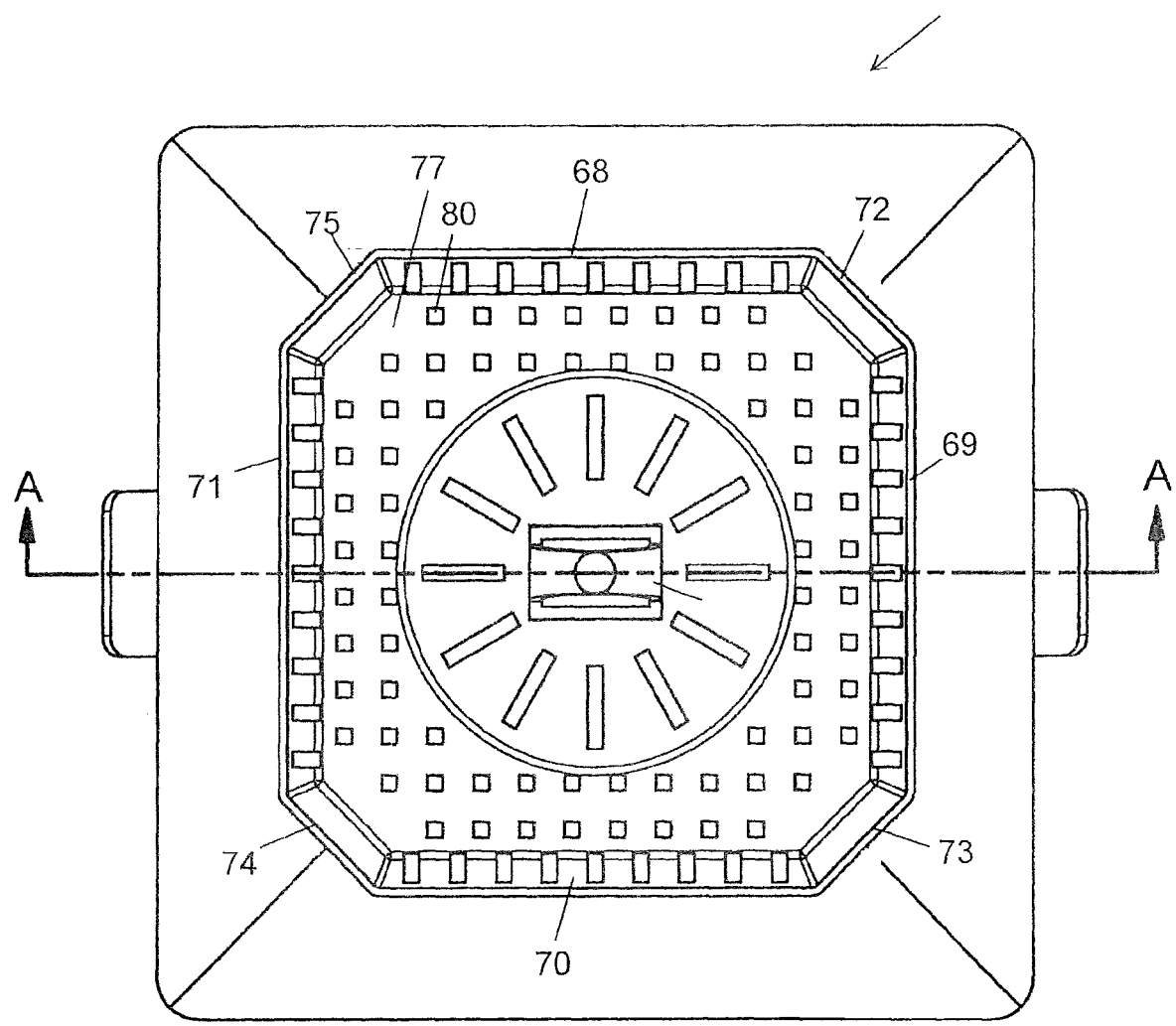
FIG. 11 is a top view of the basket strainer of FIG. 9.
Figure 12:
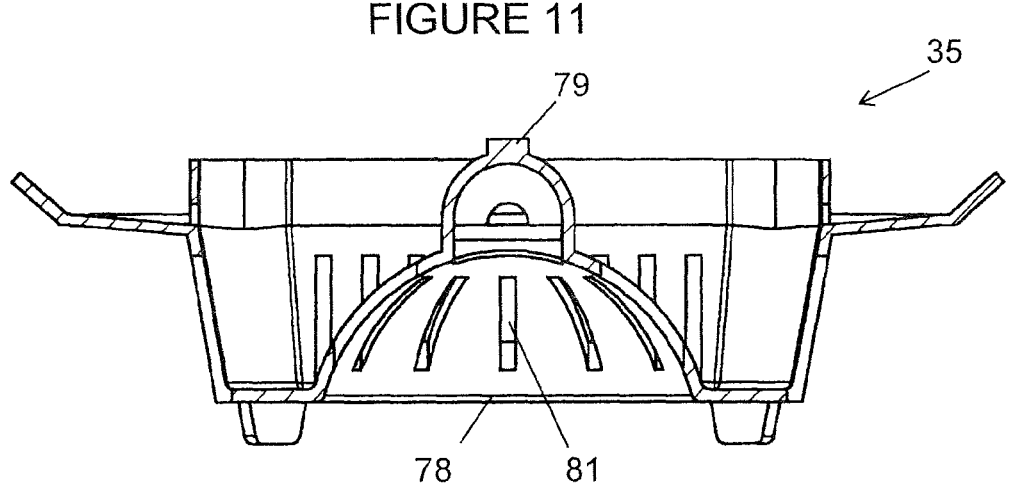
FIG. 12 is a cross-sectional view taken along line A-A of FIG. 11.
Figure 13:
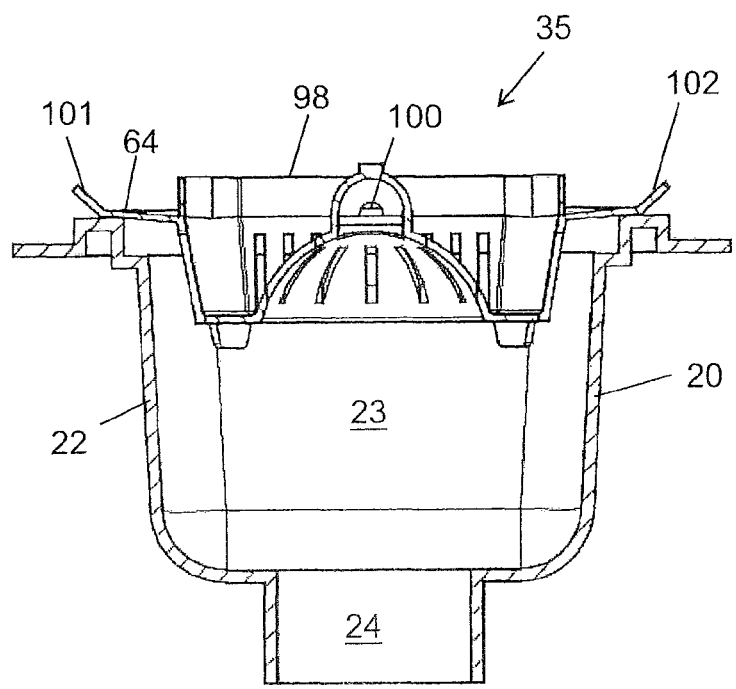
FIG. 13 is a partial cross-sectional view of the basket strainer of FIG. 9 positioned in the floor sink.
Figure 14:
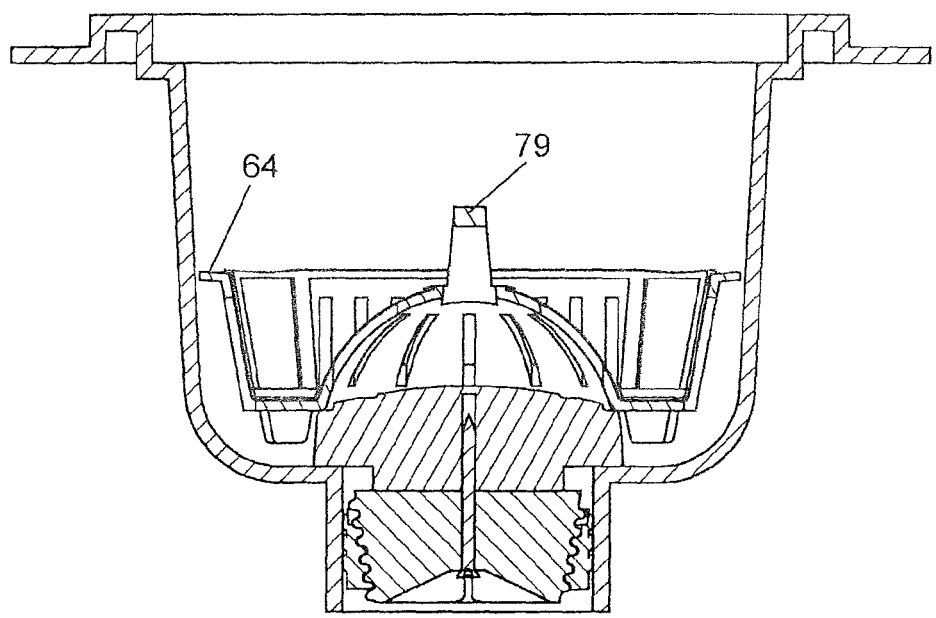
FIG. 14 is a partial three-quarter view of the basket strainer, basket filter an the strainer assembly positioned in the floor sink.

Also illustrated in this embodiment, strainer assembly 33 comprises not only the well discharge opening strainer assembly 34, and the basket strainer 35, but also basket filter 85 as illustrated in more detail in FIGS. 7-8. Basket filter 85 is constructed having a vertical perimeter frame 86 formed from separated horizontal stiff members 87 attached to one another by vertical stiff members 88. Mesh-type material 89 is affixed to the horizontal and vertical stiff members 87, 88, respectively, to form vertical basket filter walls 90 designed to prevent medium to fine particle size debris (e.g., sand, coffee grinds, oyster shells, rice, and similar particles) from escaping out of basket strainer 35. The mesh size of filter walls 90 is also preferably selected to prevent stringy foods and other similar stingy material from entering the sink discharge passageway 24 which might clog the sewerage drain pipe 25. This feature is important to prevent materials which are not easily conveyed with water and tend to settle in the bottom of p-traps in the building drainage/sewerage system. Filter walls 90 are sized to fit within basket strainer 35 with the vertical filter walls 90 positioned adjacent the vertical slotted walls 68-71 and vertical corner walls 72-75. The floor 91 of basket filter 85 is formed by a circular stiff member 92 having mesh-type material 89 affixed to the circular stiff member 92 and the lower horizontal stiff members 87. Basket filter 85 is further formed having a dome-shaped mesh-type material 93 extending upward from circular stiff member 92. An opening 94 is formed in the top area 95 of the dome-shaped mesh 93 size to permit handle 79 to extend through opening 94 to better facilitate a person grabbing handle 79 to lift basket filter 85 and basket strainer 44 to permit access to well discharge opening strainer assembly 34. The integrity of opening 94 is maintained by affixing stiff member 97 around the perimeter of opening 94.

FIGS. 9-14 illustrate another preferred embodiment of basket strainer 44 particularly useful in various non-foot traffic areas, such as under stoves or cabinets that can also serve as the primary filter for a drain normally used to receive indirect waste. In this embodiment basket strainer 44 is provided with a raised lip 98 extending upward from the top surface 99 of basket strainer perimeter flange 64 to better prevent liquid from splashing out of the discharge passageway 24 or to prevent unwanted foreign debris from accidentally falling into discharge passageway 24. The raised lip 98 has a series of overflow/back pressure openings 100 to allow water from a stopped up drain line to overflow onto the floor without interfering with the air gap between the overflow level of the drain and any indirect waste drain pipes. Openings 100 can be sized to allow water from the floor to enter basket strainer 35 and ultimately to discharge pipe 25.

In another preferred embodiment basket strainer perimeter flange 64 has at least one handle 101, and more preferably at least a second handle 102, extending upward from opposing edge areas 103 and 104 of perimeter flange 64. These handles 101, 102 are particularly useful when the floor trough or floor sink are positioned under a cooking stove or other type kitchen appliance. In this situation, one can reach under the cooking stove and grab one of the handles 101 or 102 to lift the basket strainer 35 off well discharge opening strainer assembly 34.

Figure 15:
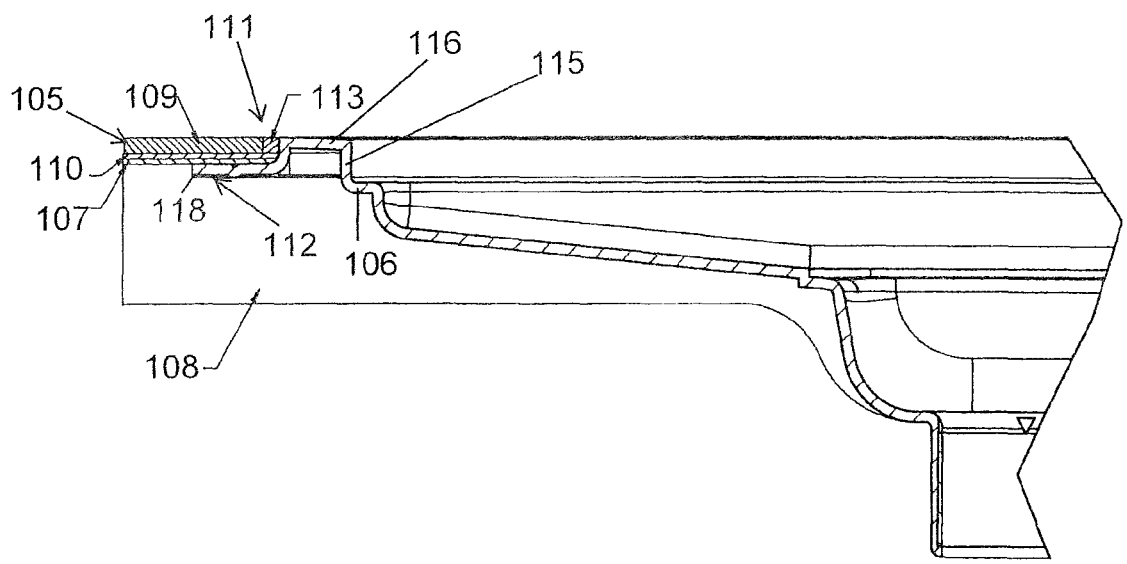
FIGS. 15-17 are three cross-sectional views of the perimeter outer flange of a novel waste receptor, such as a floor trough, used to achieve a smooth, level and even surface formed by the trough drain and the floor covering when utilizing various methods including use of a waterproofing layer, a thinset layer, a tile layer and grout, or including use of a thinset layer, a tile layer and grout, or including use of a floor coating.
Figure 16:
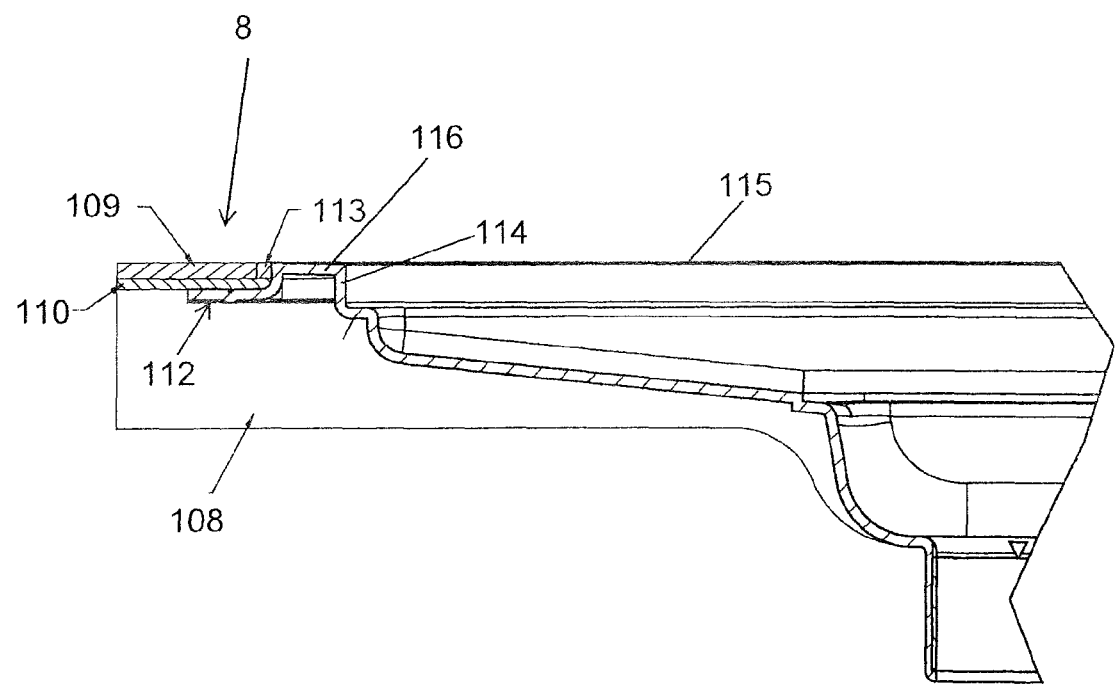
Figure 17:
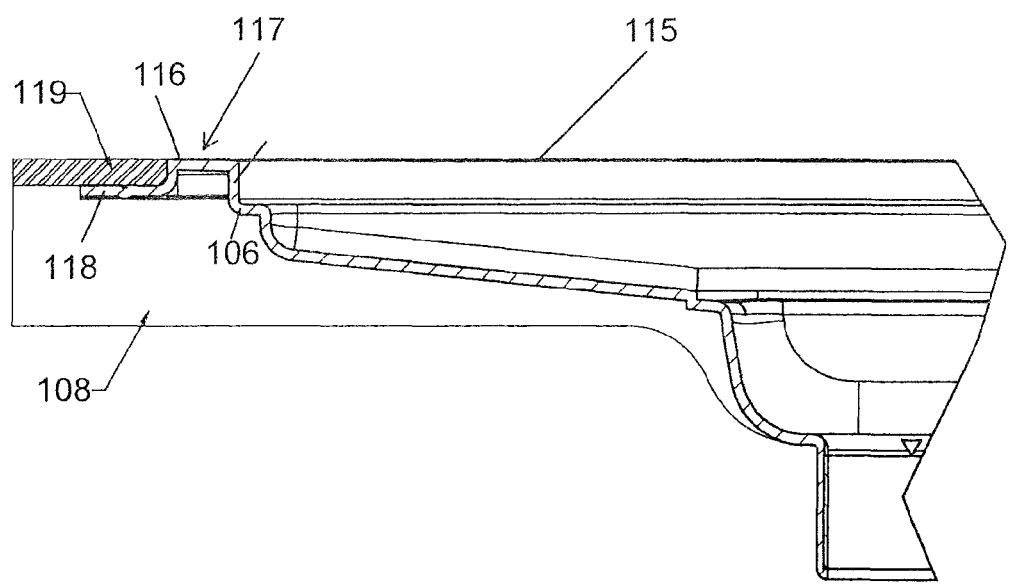

FIGS. 15-17 illustrate how the novel perimeter construction of the floor trough 1 simplifies construction of an even kitchen floor and floor trough combination. Several techniques are commonly utilized in joining the floor covering 105 and the floor trough 1 with its grate 5 positioned on floor trough seat 106. One method as illustrated in FIG. 15 is to first apply a waterproofing material 107 between the concrete 108 and the top surface material such as tile 109. Next, a thinset material 110 is placed between the waterproofing material 107 and tile 109 to hold the tile 109 in place. Any gap 111 between the tile 109 and the outer flange 112 is filled with grout 113. This method is time consuming and requires a skilled worker to achieve the desired smooth level joint formed by the tile 109 and floor trough 1. This method can be more easily utilized with a floor trough 1 constructed with the novel floor trough perimeter outer flange 112. The outer flange 112 is constructed having a seat 106 on which grate 11 can sit. The back wall 114 of seat 106 is of substantially the same height as grate top surface 115 of grate 11 and the top surface 116 of shoulder member 117. In the embodiment illustrated in FIG. 15, the extending end 117 of outer flange 112 is formed to be lower than shoulder top surface 116 by an amount sufficient to apply waterproofing material 107, a thinset 110 and tile 109 being level with shoulder top surface 116 and top surface grate 115. Grout 113 can be used to close any gap 111 between tile 109 and shoulder member 117 to complete the smooth even surface desired.

FIG. 16 illustrates a similar method except no waterproofing material 107 is utilized. Again, as in FIG. 15 the back wall 114 of seat 106 is of substantially the same height as grate top surface 115 and the shoulder member top surface 116. In this case, extending end 118 is formed to be lower than shoulder member top surface 116 by an amount sufficient to apply thinset 110 and tile 109 to be level with shoulder member top surface 116.

FIG. 17 illustrates the construction of the outer flange 112 utilized with a novel floor coating 119. Coating 119 is formed from a compound having excellent weatherable performance and property retention with high impact strength, high heat deflection, and stiffness. It is preferred that coating 119 exhibit a tensile strength of 6,100 psi or greater, a tensile modulus of 280,000 psi or greater, a flexural modulus of 280.00 psi or greater, a flexural stress at 5% strain of 9,500 psi or greater, a compressive strength of 7,500 psi or greater, a shear strength of 5,800 psi or greater, bearing strength of 29,000 psi or greater, a heat deflection temperature of 212° F. or greater, a coefficient of thermal expansion of 44 μin/in/° F., and a dielectric strength >300 V/mil. In a more preferred embodiment coating 119 is a co-extruded, very high impact polycarbonate ABS and acrylic composition sheet. The use of this floor coating 119 can eliminate the waterproofing, thinsetting and grouting steps now being practiced in the industry.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed as the invention is:

1. A strainer assembly for use with a floor waste receptor to separate captured liquid waste material from captured solids material selected from the group consisting of kitchen utensils, cooking accessories and other solids material, the floor waste receptor constructed to have vertical walls and a floor forming a well into which the liquid waste material and the captured solids material are collected and the liquid waste material is directed toward a drainage pipe extending downward from a drainage opening positioned in the floor, comprising:
   a. a sink drainage opening strainer assembly positioned to permit the liquid waste material to drain into the drainage pipe and to block the captured solids material from entering into the drainage pipe; and
   b. a basket strainer sized to fit in the well and over the sink drainage opening strainer assembly to permit the liquid waste material to pass through the basket strainer to the sink drainage opening strainer assembly, wherein the basket strainer comprises a plurality of walls that form the basket strainer, a perimeter flange affixed to and extending transverse to the plurality of walls, a raised lip affixed to and extending transverse to the perimeter flange, and at least one opening in the raised lip configured to allow liquid to enter or leave the basket strainer without overtopping the raised lip when liquid at the basket strainer reaches a predetermined depth.

2. The strainer assembly according to claim 1 wherein the sink drainage opening strainer assembly comprising:
   i. a resilient expandable hollow member having a passageway with an interior surface having internal threads and the resilient expandable hollow member sized to fit through the drainage opening,
   ii. a rigid support member having exterior threads and a first interior screw passageway extending through the rigid support member, the rigid support member sized and shaped to be screwed into the resilient expandable hollow member,
   iii. a strainer having a second interior screw passageway aligned with the first interior screw passageway; and
   iv. a screw sized to operatively pass into both the first and second interior screw passageways to affix the rigid support member to the strainer.

3. The strainer assembly according to claim 2 wherein the resilient expandable hollow member passageway has a top section and a bottom section and is shaped to have a diameter greater at its top section than at its bottom section, and wherein the rigid support member exterior threads have a diameter which is greater at an upper section of the member than at a lower section of the member.

4. The strainer assembly according to claim 2 wherein the basket strainer is sized to seat on an upper perimeter area of the strainer of the strainer assembly.

5. The strainer assembly according to claim 2 wherein the basket strainer is sized to seat in a sink wall perimeter floor seat.

6. The strainer assembly according to claim 1 wherein the basket strainer is constructed to have a dome-shaped center section and wherein a handle is affixed atop the dome-shaped center section.

7. The strainer assembly according to claim 6 further comprising a basket filter sized and shaped to fit within the basket strainer and wherein the basket filter comprises a center raised section with an opening positioned to fit over the dome-shaped center section wherein the handle extends through the opening.

8. The strainer assembly according to claim 7 further comprising a basket filter sized to fit within the basket strainer and formed having mesh walls sized to trap fine particles in the liquid waste material.

9. The strainer assembly according to claim 8 wherein the fine particles comprise one or more of sand, coffee grinds, oyster shell pieces, rice, and/or broken glass pieces.

10. The strainer assembly according to claim 1 further comprising a basket filter sized and shaped to fit within the basket strainer.

11. The strainer assembly according to claim 1 wherein one or more handles are affixed at the perimeter flange.

* * * * *